United States Patent [19]
Loos

[11] 3,828,597
[45] Aug. 13, 1974

[54] GEAR WORKING TOOL
[75] Inventor: Herbert Loos, Munich, Germany
[73] Assignee: Carl Hurth Maschinen-und Zahnradfabrik, Munich, Germany
[22] Filed: Jan. 18, 1973
[21] Appl. No.: 324,846

[30] Foreign Application Priority Data
Jan. 22, 1972  Germany............................ 2203098

[52] U.S. Cl..................................... 72/102, 72/469
[51] Int. Cl............................................. B21h 5/02
[58] Field of Search .............. 72/102, 469; 29/159.2

[56] References Cited
UNITED STATES PATENTS
3,704,612  12/1972  Loos..................................... 72/102
3,733,886  5/1973  Loos..................................... 72/469

FOREIGN PATENTS OR APPLICATIONS
1,207,776  10/1970  Great Britain..................... 29/159.2

Primary Examiner—Lowell A. Larson
Attorney, Agent, or Firm—Woodhams, Blanchard & Flynn

[57] ABSTRACT

A gear or rack-shaped tool is provided with serrated teeth wherein the serrations extend from the addendum to the dedendum of the teeth in any given tooth surface. The serrations define ribs which are of such width and so arranged that throughout the effective width of the tool the ribs in any plane normal to the tool axis and taken around the full circumference thereof will total an area equal to the corresponding area of the ribs in any other such plane. In the illustrated embodiments this is accomplished by providing ribs and grooves which are arranged on circumferentially successive teeth in a manner axially offset with respect to one another and wherein (a) said offsetting is such that the edges of ribs on circumferentially spaced teeth are at least substantially coplanar with respect to each other, (b) the magnitude of such offsetting is a sub-multiple of the combined width of a serration and a rib, preferably, (c) said offsetting is of a magnitude which is a sub-multiple of the axial dimension of said ribs. Further, all of said ribs in such embodiments are of equal dimension in an axial direction with respect to each other, all of said serrations are of equal dimensions in an axial direction with respect to each other, and the serrations themselves are of a dimension in axial direction which is equal to the corresponding dimension of the ribs. In one illustrated embodiment, the edges of adjacent ribs on successive teeth form a helical curve circumferentially around a tool whereas in the other illustrated embodiment ribs which are on teeth circumferentially spaced by two or more tooth positions are helically aligned and the corresponding ribs on intervening teeth define similar axially spaced helical lines. Of course, where the tool is a rack instead of a gear, then the lines above referred to as helical become angling lines across the width of the rack. Thus, the several ribs will bear upon each element of each workpiece tooth an equal number of times and, insofar as possible within the tolerances at which the workpiece is machined without either gap or overlapping.

4 Claims, 3 Drawing Figures

Fig. 1
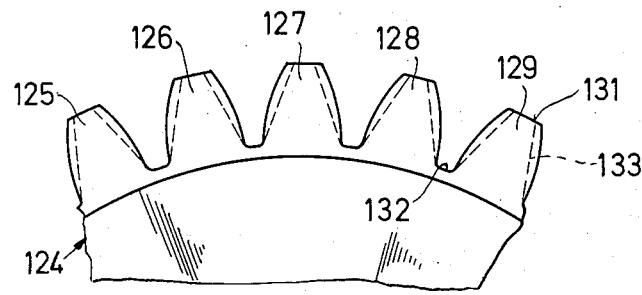
Fig. 2
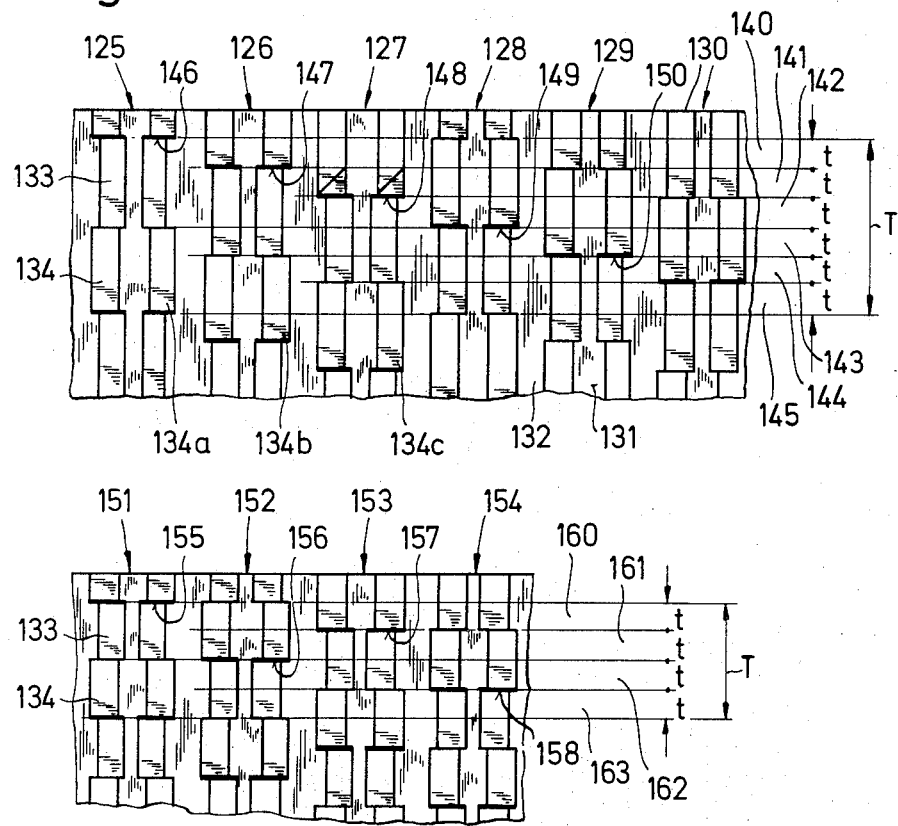
Fig. 3

3,828,597

GEAR WORKING TOOL

FIELD OF THE INVENTION

The invention relates to a gear-shaped or rack-shaped tool with straight or helical teeth for the forming of gears by rolling. Said tool is provided with serrations extending from the addendum to the dedendum of the teeth in the tooth surfaces and define ribs adjacent to said serrations which ribs are arranged on the circumferentially successive teeth in an offset manner with respect to one another.

BACKGROUND OF THE INVENTION

The invention relates to both straight-toothed and also helically toothed tools. Reference is made to the state of the art as described in German Auslegeschrift No. 1,802,228 (U.S. Pat. No. 3,704,612) and in German Patent No. 2,010,963 (U.S. Pat. No. 3,733,886).

In the prior known practice of chipless working with a toothed tool having serrated surfaces, ripple-shaped marks can appear on the tooth surfaces of the workpiece. The height of the ripples varies according to the tooth pitch and the contact force from 0.001 mm. to 0.002 mm. These ripples may also occur to a lesser degree in a gear made by a shaving process. It has already been suggested (U.S. Pat. No. 3,733,886) that these markings can be diminished by making the sum of the width of the ribs taken in longitudinal direction of any one tooth, equal to the corresponding sum of the width of the ribs on tooth surfaces facing the same side (right or left) on at least the majority of the other teeth.

The inventor has found that this teaching does achieve the desired purpose of workpiece gears with a width of up to approximately 15 mm. are involved. However, with a workpiece of greater width than this the effect decreases, namely, with an increasing width ripples again occur. He has also observed that with an increasing width it is less important to carry out the above-described teaching 100 percent on the entire workpiece tooth width.

SUMMARY OF THE INVENTION

The basic purpose of the invention is to minimize the above-mentioned ripple and to do so particularly in the case of wide workpieces. The inventor attains this purpose by utilizing the principle that all elements of the workpiece tooth surface are to be deformed in the same manner and hence all surface elements are to be exposed to the same surface pressure; whereas up to now the workpiece tooth surface was considered only from the standpoint of its entire length.

The basic purpose of the invention is attained by providing that the sum of the rib elements of the tool which act onto a selected surface element on the workpiece equals the sum of the rib elements of the tool which act on any other desired surface element on the workpiece, and that this condition is met if the second time any given surface of the workpiece is contacted it is contacted by a rib of the tool which has substantially the same axial position as the rib providing the first contact. The first and second contact can accordingly also result from the same rib.

The success of the invention is based, as aforesaid, on the fact that not the entire tooth width of the workpiece but the individual surface elements are considered. The surface element (measured in longitudinal direction of the teeth) is thereby a relatively narrow section and the corresponding approach is to be understood as also applicable to the rib elements of the tool. Thus, according to the invention it is not important to apply always the same surface pressure during each contact of a certain workpiece tooth surface with respect to the entire tooth width; but rather that as much as possible each surface element, thus each surface portion of the workpiece, is worked during rolling an equal number of times with the same surface pressure.

If the above conditions of the invention are fulfilled when a certain workpiece tooth has contacted all tool teeth, then this includes the concept that the invention is also carried out if the condition occurs at some point during a partial operation. In any case the condition must exist when one certain workpiece tooth has contacted all tool teeth an equal number of times or, in the sense of the invention, in an equivalent manner. Thus, the tool teeth are serrated to define ribs of such width, spacing and arrangement that throughout the effective width of the tool the ribs in any plane normal to the tool axis and taken around the full circumference thereof will total an area equal to the corresponding area of the ribs in any other such plane. Thus, tools are generally provided in which the edges which define the ribs are staggered on the various tool teeth in such a manner that during rolling from one edge to a coplanar edge of another tooth, the pressure is applied onto a given workpiece surface in a stepwise manner. However, these next positioned edges do not need to be arranged on adjacent tool teeth. In such a tool, the invention is carried out advantageously by providing that the smallest steps from one edge of a selected tool tooth to the coplanar edge of another tool tooth is a sub-multiple of the combined width of one rib and one serration or one whole multiple thereof.

To achieve a highly desirable surface, such a further development is of great importance in which the smallest steps each go as a whole integer into the rib. Thus, the purpose of the invention is met when all workpiece teeth have contacted as many tool teeth as steps "$t$" are contained in the pitch "T" or a multiple thereof. The purpose of the invention is also attained, though possibly not quite perfectly, if the larger portion of a workpiece tooth, but not necessarily all thereof, is worked in a manner according to the invention.

BRIEF DESCRIPTION OF THE INVENTION

The invention is further disclosed in connection with exemplary embodiments which are illustrated in FIGS. 1 to 3, of which:

FIG. 1 is a side view of a fragment of a gear-shaped tool having serrated teeth, FIG. 2 is an unrolled top view of the teeth of a tool according to the invention, FIG. 3 illustrates in unrolled condition another exemplary embodiment of the invention.

DETAILED DESCRIPTION

FIG. 1 illustrates a fragment of a gearlike tool 124, for example, for the chipless generation (also known as roll forming) of gears by a meshing rolling. Devices herefor are known and need therefore not be further described. The illustrated fragment includes five teeth 125 to 129, the tooth surfaces of which are provided with a plurality of serrations 133 which extend from the addendum 131 to the dedendum 132 (FIG. 2 shows one more tooth 130 than FIG. 1). The serrations 133 form ribs 134. With these ribs which are arranged offset or staggered on the successive teeth, as is, for example, made clear by the reference numerals 134a to 134c, the workpiece material on the tooth surface is depressed. The sum of the ribs determines the tool tooth surface which acts on the respective workpiece tooth surface. Workpiece and tool during rolling are pressed against one another with a selected force.

To describe the invention, a pitch T may be taken as formed by serration 133 and rib 134. The illustrated fragment, thus in the example the pitch T, is divided into a number of rows 140 to 145 of rib elements. Each row of rib elements corresponds to the surface elements of the workpiece tooth surface which lie in this plane or, if only one certain workpiece tooth surface is considered, to one surface element.

The ribs in the exemplary embodiment of FIG. 2 are so offset by the steps t on the successive teeth that the edges 146 to 150 which define the ribs follow a helical curve. In this example the helical curve has such a pitch that six steps or six teeth are required to form an axial lead of the magnitude of the pitch T. This number of steps or teeth is called a "group." According to the invention it is important that all surface elements of the workpiece are contacted by the same number of ribs. Thus, in the example according to FIG. 2, the ribs of the teeth 127, 128, 129 of the group being considered act on the surface element 141 of the workpiece in any type of a sequence, while the teeth 125, 126, 130 do not act on said element. The ribs of the teeth 128, 129, 130 act onto the adjacent surface element 142, while the teeth 125, 126, 127 remain ineffective. Thus, each surface element is contacted within the pitch T and within the group by the same number of rib elements with the same width. If, for example, the rib element of the tooth 127 (marked by a diagonal line) which is associated with the surface element 141 would be deleted, this would result in the surface element 142 of the respective workpiece tooth projecting beyond the other surface elements. Thus, the respective tool surface would have an error therein. A similar effect would be obtained if, for example, the edge 148 would not coincide exactly with the edge of the element; then depending on the degree of inaccuracy a more or less major mistake would result.

With respect to the exactness, of course, the machine shop tolerances in a given case must be considered; however, the workpiece surface has less errors the more accurately the edges or serrations are made.

While only one group was considered above for simplicity in discussion, the system described must be carried out for all groups and thus for the entire tool.

A different exemplary embodiment is illustrated in FIG. 3. The ribs 134 are arranged in such a manner that the edges 155, 156, 157, 158 of the teeth 151, 152, 153, 154 do not follow a helical line. The pitch T formed of a rib and a serration is divided into rib element rows 160 to 163, each row corresponds to one surface element on a selected workpiece tooth. The group has a tooth count of four, that is, four teeth are required to cause their ribs to cover the distance of one pitch T. The surface element 160 of the workpiece is contacted by the rib elements of the teeth 152, 153 but not by those of the teeth 151, 154. The ribs of the teeth 152, 154 act onto the adjacent surface element 161 but not those of the teeth 151, 153, etc. One step t is formed by the axial distance of one edge 155 from the edge which is next coplanar in the axial direction. In this embodiment, this is the edge 157 of the second following tooth. The pitch T again contains a whole number of steps t. Thus, in this embodiment, the corresponding edges of the circumferentially alternate ribs are spaced successively one step axially of each other and for instance will define a helical line around the circumference of the tool with the intermediate alternate rib edges similarly defining an axially spaced second helical line which is axially spaced from said first line a distance equal to one of said steps t.

Referring to the examples according to FIGS. 2 and 3, it must be pointed out that it is unimportant for the invention in which sequence a given workpiece tooth contacts the tool teeth, thus either, for example, in the sequence 125 to 130, etc. or 125, 127, 129, 126, 128, 130 or some different sequence. It is only important that the ribs or edges are arranged in such a manner that at completion of the work all surface elements of the workpiece have been contacted an equal number of times by a rib element, if possible, without any gaps or overlapping.

Likewise, as shown in the drawings, it is advantageous if the distance, or interval, t is a sub-multiple of the axial width of each rib. In this embodiment, though not necessarily, all of said ribs are of axial length equal to each other, all of said serrations are of axial length equal to each other and the axial length of the serrations is, as illustrated in the illustrated embodiments, also of a length equal to the axial length of the ribs. It is, however, necessary that throughout the effective width of the tool the ribs in any plane normal to the tool axis and taken around the full circumference thereof will total an area equal to the corresponding area of the ribs in any other such plane.

Of course, where the tool is a rack instead of a gear, then the lines above referred to as helical become angling lines across the width of the rack.

Use of the term "serrations" in the claims and the description is because according to the present state of the art a serration is the most economical means by which to interrupt the working surfaces, that is, to form ribs. A serration is thus each break in the surface of the tool regardless of how same is created. The term "rib" is also intended to include a convex projection from the surface of the tool tooth wherein no distinct edges appear but equivalents thereof are provided.

The embodiments of the invention in which exclusive property or privilege is claimed are defined as follows:

1. In a toothed gear-shaped or rack-shaped tool for working of gears by rolling, the teeth of said tool being provided with serrations extending from the addendum to the dedendum of said teeth in each of the tooth surfaces, said serrations defining rib elements adjacent thereto, which rib elements are on successive teeth offset with respect to one another, the improvement comprising the sum of said rib elements of the tool acting on a certain surface element on the workpiece equals the sum of said rib elements of the tool acting on any other surface element on the workpiece, said condition being met if a second time any given surface of the workpiece is contacted it is contacted by a rib element of the tool which has substantially the same axial position as the rib element of the first contact.

2. The improvement according to claim 1 wherein the edges of said rib elements arranged on the several tool teeth during rolling of a given workpiece tooth act through axial steps from rib element to rib element; and wherein the smallest steps ($t$) from one edge of one tool tooth to a parallel edge of another tool tooth is a sub-multiple of the pitch ($T$) which equals the width of the rib element and a serration or one whole number multiple thereof.

3. The improvement according to claim 2, wherein the said smallest steps (t) are sub-multiples of the width of the rib elements.

4. In a toothed gear-shaped or rack-shaped tool for working of gears by rolling, the teeth of said tool being provided with serrations extending from the top to the root of the teeth in the tooth surfaces, said serrations defining rib elements adjacent thereto, which rib elements are on successive teeth offset with respect to one another, the improvement comprising throughout the effective width of the tool, the sum of said rib elements in any plane normal to the tool axis and taken around substantially the full circumference equals the sum of the rib elements in any other such plane.

* * * * *